United States Patent [19]

Kiejzik

[11] Patent Number: 4,866,864
[45] Date of Patent: Sep. 19, 1989

[54] MULTI-CHANNEL TRANSPARENT FILM JACKET

[76] Inventor: Paul Kiejzik, 2907 Monterrey Ct., Springfield, Pa. 19064

[21] Appl. No.: 48,226

[22] Filed: May 11, 1987

[51] Int. Cl.⁴ ............................................. B29D 7/02
[52] U.S. Cl. ..................................... 40/159; 156/153; 425/373; 425/374
[58] Field of Search .................... 40/159, 158 B, 405, 40/537; 156/153, 154, 290, 291, 73.1; 55/59 SS, DIG. 11; 425/369, 373, 374, 517, D235

[56] References Cited

U.S. PATENT DOCUMENTS

| | | | |
|---|---|---|---|
| 2,775,050 | 12/1956 | Ellsworth | 40/159 |
| 2,827,659 | 3/1958 | Robun | 425/374 X |
| 3,089,803 | 5/1903 | Van Gijzen | 156/153 |
| 3,238,655 | 3/1964 | Engelstein | |
| 3,373,067 | 3/1968 | Hagstrom | 156/153 |
| 3,964,150 | 6/1976 | Moertel | 29/408 |
| 4,033,709 | 7/1977 | Kroyer | 425/373 X |
| 4,452,666 | 6/1984 | Dorman | |
| 4,471,545 | 9/1984 | Dorman | |
| 4,523,401 | 6/1985 | Dorman | |

Primary Examiner—A. Michael Chambers
Assistant Examiner—John C. Fox
Attorney, Agent, or Firm—Woodcock Washburn Kurtz Mackiewicz & Norris

[57] ABSTRACT

An improved multi-channel transparent jacket to accommodate film strips is disclosed. The jacket is constituted of top and bottom rectangular panels of flexible plastic material and ribs formed of plastic or other adhering material in situ along parallel lines between the panels and integrally bonded thereto to maintain the panels in spaced relation and to define open-ended channels whose width is substantially equal to the width of the strips. The thickness of the ribs is substantially equal to that of the strips. Improved bonding of the ribs to the panels is accomplished by striating the panels to increase the surface area within a given width available for bonding. In one embodiment, an ultrasound hammer is used in conjuction with a specialized anvil to striate the panels.

18 Claims, 2 Drawing Sheets

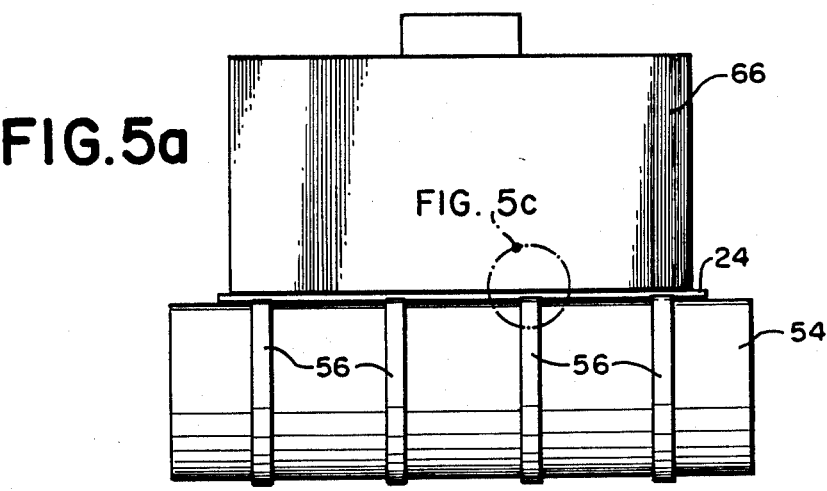
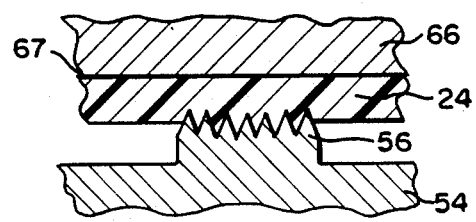
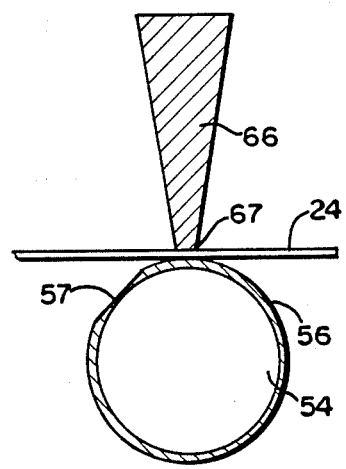
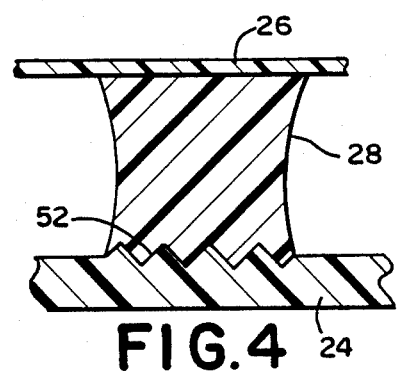

MULTI-CHANNEL TRANSPARENT FILM JACKET

BACKGROUND OF THE INVENTION

1. Field of The Invention

This invention relates generally to multi-channel jackets for microfilm, and more particularly to microfiche jackets adapted to accommodate thin microfilm strips as well as to a technique for manufacturing such jackets.

2. Description of the Prior Art

U.S. Pat. No. 3,328,655, entitled "Microfiche Master" issued in March, 1966 (Engelstein), discloses a microfiche master composed of a transparent jacket formed by two transparent plastic panels laminated together by ribs that are spaced to define a series of parallel channels or chambers adapted to accommodate microfilm strips. The loaded, multi-chambered jacket functions as a microfiche master from which reference copies may be made. This is effected by contact-printing through the front panel which is quite thin, the back panel being thicker to impart body to the jacket. Such microfiche masters are highly useful in storing and disseminating information.

The Engelstein patent points out that to facilitate contact-printing it is important not only that the top panel of the jacket be thin to minimize the separation between the sensitive film of the contact-printer and the microfilm strip in the jacket so as to obviate a loss of optical definition, but it is also essential to avoid any space between the film strip and the overlying top panel. Since this spacing is determined by the ribs that separate the top panel from the bottom panel of the jacket, the thickness of the ribs is made substantially equal to the thickness of the microfilm. Thus, the film strip is snugly received within the chamber.

In the jacket disclosed in the Engelstein patent, preformed plastic or paper ribs are adhesively secured to the top and bottom panels. Hence the spacer ribs act as carriers for an adhesive agent to effect lamination. When the requirement is for very thin ribs to match very thin microfilm, it becomes commercially impracticable to manipulate the thin ribs in fabricating the jacket.

A known alternative approach to producing microfilm jackets without preformed ribs is to define the channels by an ultrasonic sealing technique wherein sealing is carried out along parallel lines, causing the top panel to belly out with respect to the bottom panel of the jacket, thereby defining the necessary channels or chambers for receiving the microfilm.

One drawback to this approach is that in ultrasonically sealing polyester for microfiche jackets, the heat created by the sealing action impairs the polymeric properties of the panel material and weakens the jacket, making it relatively easy to tear or fold the jacket along the weakened sealing lines. Moreover, with an established jacket format, the chambers defined by linear seals are significantly broader than the width of the film strips received therein so that the strips are loosely rather than snugly held.

A second known alternative approach to producing microfilm jackets without preformed ribs is to form the ribs by extruding a set of molten streams of plastic material in parallel paths Such a method is disclosed in U.S. Pat. No. 4,471,545 (Dorman), issued Sept. 18, 1984, and its progeny U.S. Pat. No. 4,452,666, issued Jun. 5, 1984, and U.S. Pat. No. 4,523,401, issued Jun. 18, 1985. Those patents disclose a method of making microfilm jackets by extruding a set of parallel molten streams of plastic material between webs of transparent panel material and then passing the panels between combining rolls whereby the molten streams are compressively bonded.

Such a method suffers from problems of nonoptimal bonding. The beads of melted plastic begin to cool immediately upon leaving the extruder, forming a skin or outer film that causes a superficial bonding between the layers that can end up being delaminated rather easily upon cooling.

Accordingly, there exists a need for a method of manufacturing multi-channel transparent film jackets for use with microfilm that hold the microfilm snugly, are usable for making contact prints, and exhibit increased durability.

SUMMARY OF THE INVENTION

This invention relates to a method of manufacturing a transparent multi-channel jacket for microfilm wherein the channels are defined by ribs integrally formed with the panels of the jacket and serve to maintain a desired spacing therebetween. More particularly, these ribs are formed of an adhering material that is bonded to of two sheets of flexible polyester. The improvement of the present invention is a means whereby the bonding of this adhering material to the flexible polyester is improved by forming a series of striations in the panel of flexible polyester to expose more surface area of the flexible polyester to the adhering material while forming a rib having the same width as before. The striations can be formed by passing the flexible polyester over an anvil that has raised ridges of threads while simultaneously impacting the opposite side of the flexible polyester with an ultrasound hammer. Such a method would normally result in a series of parallel striations aligned in the same direction as the ribs.

Thus, it is an object of the present invention to provide a method of improving the bonding of ribs to panels of flexible polyester in the manufacture of multi-channel transparent film jackets. It is a further object of the present invention to provide an improved multi-channel transparent film jacket having a better bonded rib structure resulting in increased durability.

This and further objects and advantages will be apparent to those skilled in the art in connection with the detailed description of the preferred embodiments set forth below.

BRIEF DESCRIPTION OF THE DRAWINGS

FIG. 4 is an enlarged section taken through the jacket.

FIGS. 5a–5c are a series of drawings showing a preferred embodiment of the machine used to striate the flexible polyester according to the present invention. FIG. 5a is a simplified drawing of the striating machine as a whole. FIG. 5b is an enlarged portion of FIG. 5a viewed in cross section. FIG. 5c is an enlarged cross-sectional portion of FIG. 5b taken at a right angle to the cross section of FIG. 5b.

DETAILED DESCRIPTION OF THE PREFERRED EMBODIMENTS

Figure 1:
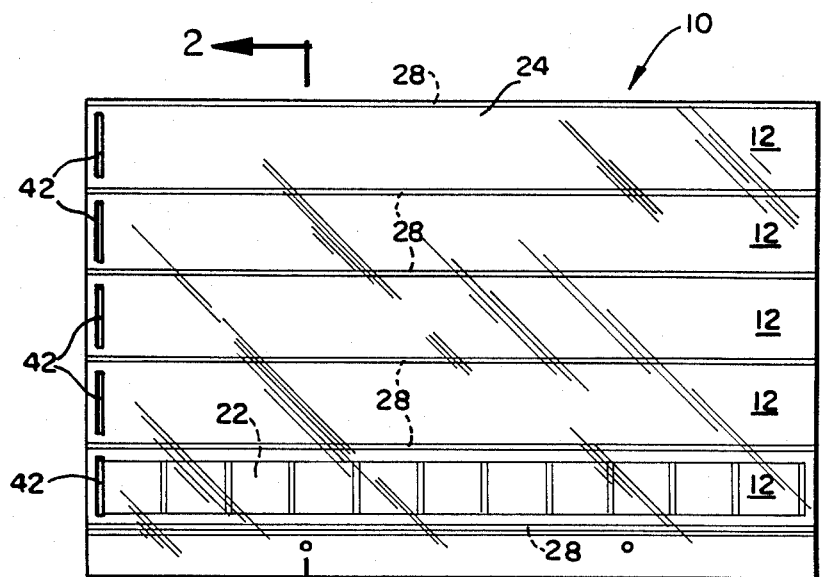
FIG. 1 is a plane view of a multi-channel jacket in accordance with the present invention.
Figure 2:
FIG. 2 is a transverse section taken in the plane indicated by line 2—2 in FIG. 1.

Referring now in detail to FIGS. 1 and 2 showing a microfiche master in accordance with the invention, the microfiche master is constituted by a transparent multiple-chamber jacket 10 having parallel channels or chambers 12. Contained in one of the sections is a microfilm strip or chip 22, the strip or chip having preferably been inserted by means of a suitable reader-filler machine.

The microfilm strips need not be inserted one at a time, and in practice, additional strips may be added to supplement existing records. For example, if each chamber has a capacity of ten film frames, then if the first inserted strip is four frames long, there is still room for six more frames. It is important, however, that the second film chip or strip not override the first, for then the microfiche would not be usable. Hence, one reason why it is vital that strips be snugly container in the channels is in order to prevent a later-inserted film strip from riding over a previously-inserted strip.

Jacket 10 is comprised of two transparent rectangular panels 24 and 26 in superposed relation, the panels being formed of clear, flexible plastic material, preferably a polyester or Mylar (polyethylene terephthalate) film. Polyester material is advantageous because of its exceptional clarity, high strength and dimensional stabililty, however other transparent materials may be used.

Interposed between the top and back panels and integral therewith are longitudinally-extending ribs 28. These ribs are of the same or of a similar material as the panels and lie in parallel relation to define chambers 12 which are open at each end. In practice, the ribs may be formed of polyvinyl chloride, polyethylene or other suitable synthetic plastic material but are preferably polyester. The chambers are of such width as to accommodate microfilm strips of a given size, such as 16 mm film.

The back panel 24 is somewhat wider than top panel 26 to provide a marginal extension which is preferably coated with translucent coating 40 for titling the microfiche master. This title will be reproduced in contact-printing, because of the translucence of the coating.

To facilitate insertion of microfilm strips or chips. a series of generally rectangular slots 42, are cut across back panel 24 adjacent the front end of the chamber openings. Top panel 26 is preferably exceptionally thin (i.e., about one mil or less) to facilitate contact-printing, whereas back panel 24 is preferably of heavier gauge transparent material (i.e., 3 to 5 mils) to give body to the microfiche.

The ribs are of substantially the same thickness as the inserted microfilm strips, or slightly thinner, so that sensitive duplicating film is virtually in contact with the microfilm inserts when contact-printing takes place. When the microfilm strip to be inserted is relatively thin (i.e., 3 mils or less), the ribs need to be correspondingly thin.

Figure 3:
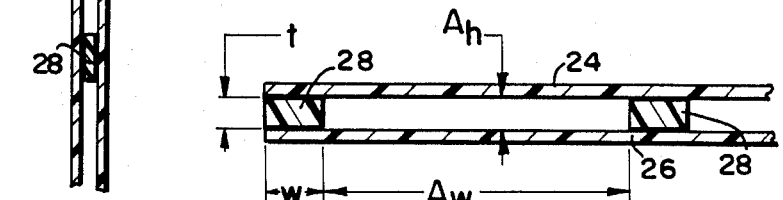
FIG. 3 is a detail of the jacket.

Referring now to FIG. 3, the parameters involved in establishing channels within the jacket formed by panels 24 and 26 a channel 12 whose width $A_w$ is slightly wider than the width of the microfilm strip to be inserted therebetween, and whose height $A_h$ is substantially the same as the thickness of this strip are shown. The channel width $A_w$ is determined by the distance between ribs 28, whereas the channel height is determined by the thickness of these ribs.

When making jackets with pre-formed ribs made of adhesively-coated paper or plastic ribbons, one has merely to supply to the jacket-forming machine a set of ribbons having the desired width and thickness and to maintain the proper spacing therebetween; these ribbons being adhered to the panels. When making jackets with hot melt plastic material, as preferred, the ribs are created in situ by introducing between advancing webs of panel material parallel filaments or streams of molten plastic that are then compressively bonded to the webs in combining rolls which flatten the streams, transforming the streams into integral ribs having the desired thickness and width.

The method and device of the present invention can be used with either of these prior art methods to improve the bonding between the rib-forming material and the Mylar panels. The product of the present invention is illustrated in more detailed in FIG. 4. FIG. 4 shows a detailed blow up of a portion of the multi-channel jacket 10. The back panel 24 is shown in conjunction with adhered rib 28 and top panel 26. The improvement of the present invention comprises the use of striations 52 embossed into back panel 24. These striations 52 are embossed into back panel 24 prior to combining the various components of the multi-channel jacket and in particular, prior to application of adhesive material to the back panel. The striations 52 correspond to the desired width and placement of the ribs 28. These striations 52 form parallel bonding sites on the back panel and act to increase the available surface area for bonding of the adhesive material without expanding the width of the rib. Since the adhering material used to form the ribs now has more surface area to bond to, a more effective bond is obtained.

The concept of striating the back panel 24 is a general one and any variety of shapes or striation designs can be employed without departing from the inventive concept herein. A preferred embodiment, however, involves the formation of a series of parallel striations aligned along the length of each rib site. Thus, each series of parallel striations forms an improved bonding site for attachment of the adhering material used to form the rib.

One embodiment of an apparatus useful for manufacturing the improved back panel and resulting multichannel jacket according to the present invention is shown in FIGS. 5a,b. FIGS. 5a,b illustrate a cylindrical anvil 54 cut with a series of threaded sections 56 interspersed with non-raised regions. Such an anvil can be easily cut using a lathe with the resulting raised sections made up of, for example, a screw thread design. Alternatively, these raised sections 56 can be made up of any preferred design, e.g., concentric rings, diamond shaped cross hatching, etc. The object of these raised portions, which can be accomplished by any such variety of designs, is to form a striation pattern 52, upon the flexible polyester back panel 24.

Returning to FIGS. 5a,b, the head portion 66 of an ultrasound hammer mechanism as would be well known to those of ordinary skill in the art, is shown. Such an ultrasound hammer is disposed in close proximity to the anvil 54, such that when the ultrasound hammer is in operation and a sheet of flexible polyester is passed between the anvil 54 and the hammer head 6 the hammer head 66 forces the flexible polyester against the raised sections of the anvil 54, thereby striating the flexible polyester.

It is possible and preferable to permit the anvil 54 to rotate and to provide a flat even portion 57 for securing skip seals in the microfilm jackets.

While any variety of anvils and ultrasound hammers can be used, one preferred embodiment utilizes a hammer with an amplitude of about 1 mil. The head 66 of the ultrasound hammer should preferably be formed in a shape such as a radius or flat end 67 that optimizes the striation of the flexible polyester in conjunction with the configuration of the raised portions of the anvil 54.

FIG. 5c shows a detail of the embossing of back panel 24 by hammer head 66 and anvil 54 having sections 56.

While one embodiment has been disclosed as in FIG. 5a,b, it is clear that numerous other methods known to those of ordinary skill in the art may be employed to striate the flexible polyester.

The top panel 26 of the multi-channel jacket is preferably made of Mylar, a polyester film made from polyethylene terephthalate. This top panel 26 is preferably as thin as is practicable so that contact prints can be made without loss of reproductive quality due to the thickness of the Mylar panel. Thus, the top panel 26 is typically on the order of half a mil thick.

The back panel 24, on the other hand, is typically thicker since its thickness is not relevant to the quality of contact prints. Having a thicker back panel imparts body to the jacket. Thus, the back panel 24 is typically on the order of 3 mils thick. Other transparent materials may serve as panels if the adhering material is adherable to them.

In order to effectively use the method of the present invention, the panel to be striated must be sufficiently thick to allow for the striation while still retaining sufficient strength. Given an amplitude of an ultrasound hammer of approximately 1 mil, it is believed that the lower limit of thickness required for the flexible polyester material is approximately 2 mils. Thus, use of the method of the present invention is generally limited to the back panel 24 because the top panel 26 is generally too thin to withstand the striating process. Should the top panel be sufficiently thick, it would be apparent that the method of the present invention could be used on that panel as well. In this spirit, it is preferable that the striations 52 of the back panel 24 be at least ¼ of mil deep. However, it should be noted that any striation according to the method of the present invention would accomplish the desired results to some extent.

Having thus described the invention, it is to be understood that the invention is not limited to the embodiments set forth herein for purposes of exemplification, but is to be limited only by the scope of the attached claims, including a full range of equivalents to which each element thereof is entitled.

What is claimed is:

1. A multi-channel transparent jacket for accommodating film strips comprising:
   a first rectangular panel formed of flexible polyester and having a plurality of parallel bonding sites comprised of a plurality of striations;
   a second rectangular panel formed of flexible polyester;
   a plurality of ribs formed of adhering material adherable to the material of said panels integrally bonded to said parallel bonding sites and to the second rectangular panel to form a unitary structure, said ribs maintaining said panels in parallel planes to define open-end channels.

2. The jacket of claim 1 wherein the film strips have a predetermined thickness and a predetermined width and said channels have a width substantially equal to the width of said strips and said ribs have a thickness substantially equal to the thickness of said strips.

3. The jacket of claim 1 wherein the striations are parallel.

4. The jacket of claim 1 wherein the adhering material is a moldable plastic material.

5. The jacket of claim 1 wherein said polyester panels are formed by polyethylene terephthalate.

6. The jacket of claim 1 wherein said second panel is no thicker than about one mil to facilitate contact printing of the jacket when it contains film strips.

7. The jacket of claim 1 wherein said plurality of striations are each at least ¼ mil deep.

8. A method of producing a multi-channel transparent jacket for accommodating film strips comprising the steps of:
   providing a first rectangular panel of flexible polyester;
   embossing a plurality of parallel bonding sites into said first panel;
   applying an adhering material onto said plurality of parallel bonding sites to form ribs;
   superposing a second panel of flexible polyester upon said adhering material ribs to provide a unitary structure comprising said first and second panels separated by said adhering material, said ribs maintaining said panels in parallel planes to define open-end channels.

9. The method of claim 8 wherein the step of embossing the first panel comprises the steps of:
   passing the first panel over an anvil having a plurality of raised embossing ridges arranged in parallel sections with intervening non-raised sections; and
   hammering said first panel as it passes over said anvil to create the plurality of parallel bonding sites, each bonding site comprised of a plurality of striations.

10. The method of claim 9 wherein the anvil is cylindrical.

11. The method of claim 10 wherein the raised embossing ridges are formed as screw threads.

12. The method of claim 9 wherein the embossing ridges are parallel to each other and to the direction in which the first panel passes over the anvil.

13. The method of claim 9 wherein the step of hammering said first panel uses an ultrasound hammer.

14. The method of claim 11 wherein said plurality of striations are each at least ¼ mil deep.

15. The method of claim 8 wherein the film strips have a predetermined thickness and a predetermined width and said channels have a width substantially equal to the width of said strips and said ribs have a thickness substantially equal to the thickness of said strips.

16. The method of claim 8 wherein the adhering material is a moldable plastic material.

17. The method of claim 8 wherein said polyester panels are formed by polyethylene terephthalate.

18. The method of claim 8 wherein said second panel is no thicker than about one mil to facilitate contact printing of the jacket when it contains film strips.

* * * * *